US012665801B2

(12) United States Patent (10) Patent No.: US 12,665,801 B2
Kleinerman et al. (45) **Date of Patent: \*Jun. 23, 2026**

(54) RADIO RECEIVER WITH FREQUENCY SEGMENT OFFSET COMPENSATION AND RELATED METHODS

(71) Applicant: Skyworks Solutions, Inc., Irvine, CA (US)

(72) Inventors: Alexander Kleinerman, Austin, TX (US); Bradley Arthur Wallace, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/618,415

(22) Filed: Mar. 27, 2024

(65) Prior Publication Data

US 2024/0333573 A1 Oct. 3, 2024

Related U.S. Application Data

(60) Provisional application No. 63/493,530, filed on Mar. 31, 2023, provisional application No. 63/493,480, filed on Mar. 31, 2023.

(51) Int. Cl.
H04L 27/26 (2006.01)
H04L 5/00 (2006.01)
H04L 27/00 (2006.01)

(52) U.S. Cl.
CPC ........ H04L 27/2647 (2013.01); H04L 5/0007 (2013.01); H04L 27/0014 (2013.01); H04L 27/2621 (2013.01); H04L 2027/0026 (2013.01)

(58) Field of Classification Search
CPC .............. H04L 27/2647; H04L 5/0007; H04L 27/0014; H04L 27/2621; H04L 2027/0026
See application file for complete search history.

(56) References Cited

U.S. PATENT DOCUMENTS

| | | | |
|---|---|---|---|
| 5,909,148 A | 6/1999 | Tanaka | |
| 6,546,055 B1 | 4/2003 | Schmidl et al. | |
| 7,324,612 B2 * | 1/2008 | Shearer, III | ......... H04L 27/2657 375/326 |
| 7,418,049 B2 | 8/2008 | Wallace | |
| 7,443,783 B2 * | 10/2008 | DeChamps | ......... H04L 27/2647 370/208 |
| 7,590,193 B2 | 9/2009 | Han | |
| 7,894,325 B2 | 2/2011 | Chadha et al. | |
| 8,369,465 B2 | 2/2013 | Oh et al. | |
| 11,381,267 B1 | 7/2022 | Kleinerman | |
| 11,652,667 B2 | 5/2023 | Kleinerman | |
| 2003/0063558 A1 | 4/2003 | Kim | |

(Continued)

*Primary Examiner* — Janice N Tieu
(74) *Attorney, Agent, or Firm* — Knobbe, Martens, Olson & Bear, LLP

(57) ABSTRACT

Aspects of this disclosure relate to frequency offset compensation in a radio receiver. In embodiments of the disclosure, a frequency domain orthogonal frequency-division multiplexing signal can be received, and a phase error offset in individual frequency segments of the frequency domain orthogonal frequency-division multiplexing signal can be compensated for based on estimates of the phase error offset for the individual frequency segments. Related radio receivers and radio systems are disclosed.

19 Claims, 7 Drawing Sheets

(56) References Cited

U.S. PATENT DOCUMENTS

| | | | |
|---|---|---|---|
| 2007/0230591 A1* | 10/2007 | Choi | H04L 27/2657 |
| | | | 375/260 |
| 2010/0054378 A1* | 3/2010 | Hung | H04L 27/16 |
| | | | 375/344 |
| 2010/0095180 A1 | 4/2010 | Sawai | |
| 2010/0135437 A1 | 6/2010 | Lee et al. | |
| 2010/0239033 A1* | 9/2010 | Shiue | H04L 27/266 |
| | | | 375/260 |
| 2015/0110228 A1* | 4/2015 | Elenes | H04L 27/2657 |
| | | | 375/343 |
| 2017/0346579 A1* | 11/2017 | Barghi | H04L 27/0008 |
| 2023/0205828 A1 | 6/2023 | Hong et al. | |
| 2024/0333564 A1 | 10/2024 | Kleinerman et al. | |

* cited by examiner

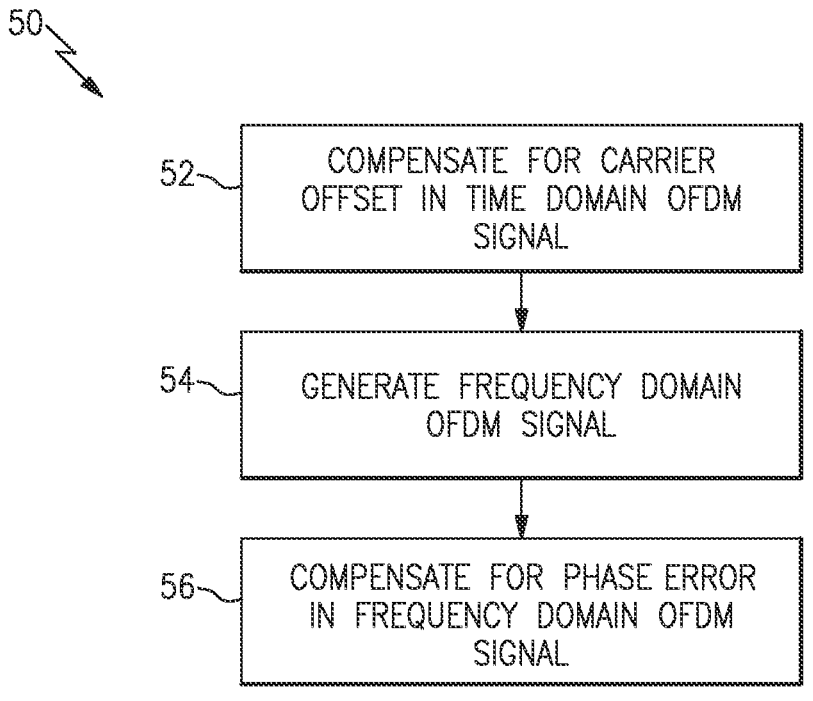
_FIG.5_
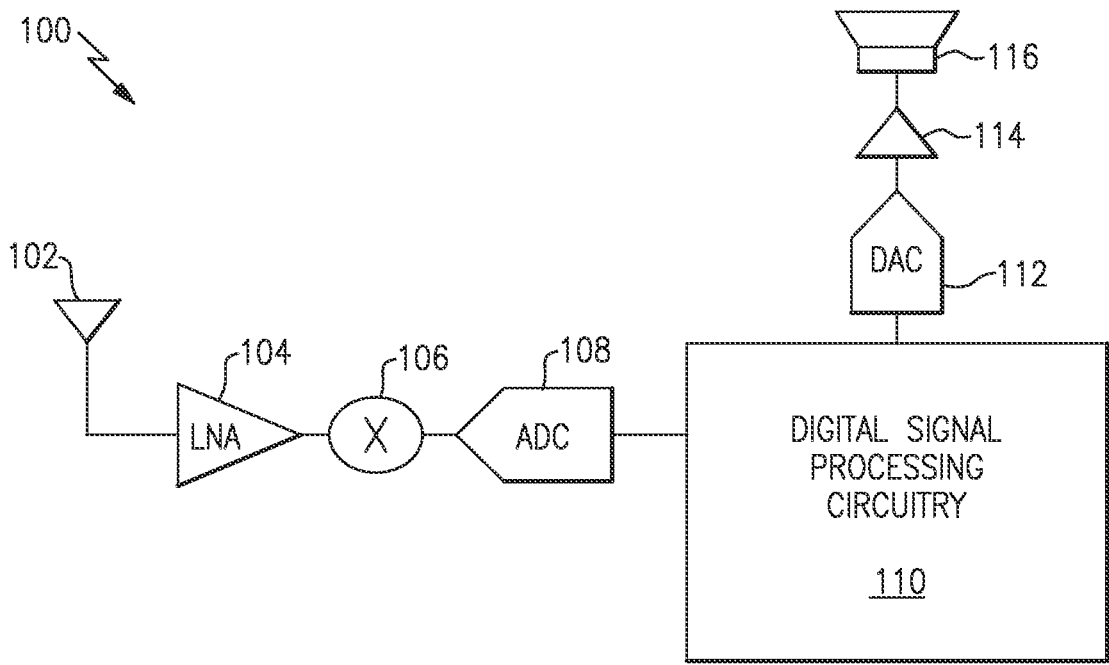
_FIG.6_

RADIO RECEIVER WITH FREQUENCY SEGMENT OFFSET COMPENSATION AND RELATED METHODS

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/493,530, filed Mar. 31, 2023 and titled "RADIO RECEIVER WITH OFFSET COMPENSATION LOOPS AND RELATED METHODS," and claims the benefit of priority of U.S. Provisional Application No. 63/493,480, filed Mar. 31, 2023 and titled "RADIO RECEIVER WITH FREQUENCY SEGMENT OFFSET COMPENSATION AND RELATED METHODS," the disclosures of each of which are hereby incorporated by reference in their entireties and for all purposes.

BACKGROUND

Technical Field

The disclosed technology relates to digital radio. Embodiments disclosed herein relate to compensating for offsets in a radio signal.

Description of Related Technology

Digital radio technology involves transmitting digital signals in the radio spectrum. Digital radio signal use digital encoding. In digital broadcasting systems, analog signals can be digitized and transmitted using a digital modulation scheme. Receiving devices can receive and process a digital radio signal.

Radio receivers are implemented in a variety of applications. In addition to standalone radios for receipt of broadcast radio signals, a wide variety of devices can include a radio receiver (and often paired with a transmitter). Modem circuitry can be present in any device having wireless capabilities. While some broadcast radio signals are transmitted with analog coding (e.g., amplitude modulation (AM) and frequency modulation (FM) signals), other terrestrial and satellite wireless communication systems use digital encoding. Example digital radio systems include systems that can be implemented in accordance with National Radio System Committee (NRSC-5C, also known as HD™ radio), Digital Audio Broadcasting (DAB), Digital Radio Mondiale (DRM), Convergent Digital Radio (CDR), or another suitable digital radio standard.

Radio signals have a predefined carrier frequency. The transmitted carrier frequency is known to the receiver and is applied during demodulation process. However, both transmitter and receiver frequency generators may not be completely accurate and are allowed to have some deviation from the desired frequency. The difference between transmitter and receiver frequencies can cause the demodulated signal to have a frequency offset. In some cases, additional changing frequency offset can be caused by Doppler channel conditions. Such frequency offsets can degrade signal quality if not compensated properly, for example, in orthogonal frequency-division multiplexing (OFDM), it can cause interference between subcarriers and increase bit error rate at the output of the demodulator. Compensating for frequency offsets in radio receivers can be desirable.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of frequency offset compensation in a radio receiver. The method includes compensating, in the radio receiver, for a carrier frequency offset in a time domain orthogonal frequency-division multiplexing signal based on an estimate of the carrier frequency offset. The method also includes generating, in the radio receiver, a frequency domain signal from the time domain orthogonal frequency-division multiplexing signal. The method additionally includes compensating, in the radio receiver, for a phase error offset in the frequency domain signal based on an estimate of the phase error offset.

The method can include generating the estimate of the carrier frequency offset in the time domain. The method can include comprising generating the estimate of the carrier frequency offset based on cyclic prefix correlation. The method can include generating the estimate of the carrier frequency offset with a frequency domain offset estimation.

A first offset compensation loop can perform the compensating for the carrier frequency offset and a second offset compensation loop can perform the compensating for the phase error offset. The first offset compensation loop can include a first loop filter having a longer time constant than a second loop filter of the second offset compensation loop.

Compensating for the carrier frequency offset can be applied before buffering one or more symbols of the time domain orthogonal frequency-division multiplexing signal.

The method can include generating the estimate of the phase error offset using average phase error estimation.

Compensating for the phase error offset can be applied before equalizing the frequency domain signal. Compensating for the phase error offset can be applied on a plurality of individual frequency segments of the frequency domain signal.

The time domain orthogonal frequency-division multiplexing signal can be a Digital Audio Broadcasting signal.

Another aspect of this disclosure is a radio receiver with frequency offset compensation. The radio receiver includes a first compensation loop, a Fourier transform engine, and a second compensation loop. The first compensation loop is configured to compensate for carrier frequency offset in a time domain signal. The first compensation loop includes a carrier frequency offset estimation circuit and a first loop filter. The Fourier transform engine is configured to convert the time domain signal into frequency domain signal. The second compensation loop is configured to apply phase error offset compensation to the frequency domain signal. The second compensation loop includes a phase error offset estimation circuit and a second loop filter.

The first loop filter can have a longer time constant than the second loop filter.

The time domain signal can be an orthogonal frequency-division multiplexing signal.

The carrier frequency offset estimation circuit can perform cyclic prefix correlation. The carrier frequency offset estimation circuit can perform time domain offset estimation. The carrier frequency offset estimation circuit can perform frequency domain offset estimation.

The radio receiver can include a buffer configured to store a plurality of orthogonal frequency-division multiplexing symbols. The first compensation loop can be configured to receive an orthogonal frequency-division multiplexing symbol from the buffer.

The radio receiver can include a first phase rotator and a buffer. The buffer can be in a signal path between the first phase rotator and the Fourier transform engine. The first phase rotator can be configured to receive a first offset compensation value from the first compensation loop. The radio receiver can include a second phase rotator and an equalizer. The second phase rotator can be in a signal path from the Fourier transform engine to the equalizer. The second phase rotator can be configured to receive a second offset compensation value from the second compensation loop. The buffer can store a plurality of orthogonal frequency-division multiplexing symbols.

The second compensation loop can be configured to generate a plurality of second offset compensation values for respective frequency segments of the frequency domain signal. The second compensation loop can include a plurality of additional phase error offset estimation circuits each associated with a respective frequency segment of the frequency domain signal and a plurality of additional second loop filters.

Another aspect of this disclosure is a radio system with frequency offset compensation and phase error compensation. The radio system includes at least one antenna configured to receive a radio signal and a radio receiver. The radio receiver includes a first compensation loop and a second compensation loop. The first compensation loop is configured to apply carrier frequency offset compensation to the radio signal in time domain circuitry. The second compensation loop is configured to apply phase offset compensation to the radio signal in frequency domain circuitry.

The radio receiver can be implemented in accordance with any suitable principles and advantages disclosed herein.

Another aspect of this disclosure is a method of frequency offset compensation in a radio receiver. The method includes receiving a frequency domain orthogonal frequency division multiplexing signal in the radio receiver; and compensating, in the radio receiver, for a phase error offset in individual frequency segments of the frequency domain orthogonal frequency-division multiplexing signal based on estimates of the phase error offset for the individual frequency segments.

The method can include generating the estimates of the phase error offsets with a plurality of phase error offset estimation circuits. Each of the phase error offset estimation circuits can be associated with a respective frequency segment of the individual frequency segments. The method can include filtering the estimates of the phase error offsets with respective loop filters. The compensating can be based on outputs of the loop filters.

Compensating for the phase error offset can be applied before equalizing the frequency domain signal.

The method can include generating the estimates of the phase error offsets using average phase error estimation.

The method can include compensating, in the radio receiver, for a carrier frequency offset in a time domain orthogonal frequency-division multiplexing signal based on an estimate of the carrier frequency offset; and generating, in the radio receiver, the frequency domain orthogonal frequency division multiplexing signal from the time domain orthogonal frequency-division multiplexing signal.

The method can include storing time domain orthogonal frequency-division multiplexing symbols in a buffer. The buffer can have an output coupled to an input of a Fourier transform engine that generates the frequency domain orthogonal frequency division multiplexing signal.

The method can include generating, with a Fourier transform engine, the frequency domain orthogonal frequency division multiplexing signal from a time domain orthogonal frequency division multiplexing signal.

The frequency domain orthogonal frequency-division multiplexing signal can be a Digital Audio Broadcasting signal.

Another aspect of this disclosure is a radio receiver with frequency offset compensation. The radio receiver includes a Fourier transform engine and a compensation loop. The Fourier transform engine is configured to convert a time domain orthogonal frequency division multiplexing signal into frequency domain orthogonal frequency division multiplexing signal. The compensation loop configured to apply phase error offset compensation to individual frequency segments of the frequency domain orthogonal frequency division multiplexing signal. The compensation loop includes a plurality of phase error offset estimation circuits and a plurality of loop filters.

The radio receiver can include a plurality of phase rotators and an equalizer. The plurality of phase rotators can be in a signal path from the Fourier transform engine to the equalizer. The plurality of phase rotators can be connected to outputs of the plurality of loop filters. The plurality of phase error offset estimation circuits can be in signal paths between the equalizer and the plurality of loop filters.

The radio receiver can include another compensation loop configured to compensate for carrier frequency offset in the time domain orthogonal frequency division multiplexing signal. The another compensation loop can include a carrier frequency offset estimation circuit and another loop filter.

The radio receiver can include a buffer configured to store time domain orthogonal frequency-division multiplexing symbols. The buffer can have an output coupled to an input of the Fourier transform engine.

The plurality of phase error offset estimation circuits can include at least 4 phase error offset estimation circuits.

Phase error offset in the frequency domain orthogonal frequency-division multiplexing signal can be frequency selective.

Another aspect of this disclosure is a radio system with frequency offset compensation and phase error compensation. The radio system includes at least one antenna configured to receive a radio signal and a radio receiver including a compensation loop. The radio signal is an orthogonal frequency-division multiplexing signal. The compensation loop is configured to apply phase offset compensation to individual frequency segments of the radio signal in frequency domain circuitry.

The radio receiver can include another compensation loop configured to compensate for carrier frequency offset in the radio frequency signal in time domain circuitry.

The radio system can include a speaker in communication with the radio receiver.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

The present disclosure relates to U.S. patent application Ser. No. 18/618,145, titled "RADIO RECEIVER WITH OFFSET COMPENSATION LOOPS AND RELATED METHODS," filed on even date herewith, the entire disclosure of which is hereby incorporated by reference herein.

BRIEF DESCRIPTION OF THE DRAWINGS

Embodiments of this disclosure will now be described, by way of non-limiting example, with reference to the accompanying drawings.

FIG. 5 is a flow diagram of a method of offset compensation according to an embodiment.

FIG. 6 is a schematic diagram of an example radio system according to an embodiment.

DETAILED DESCRIPTION OF CERTAIN EMBODIMENTS

Figure 1:
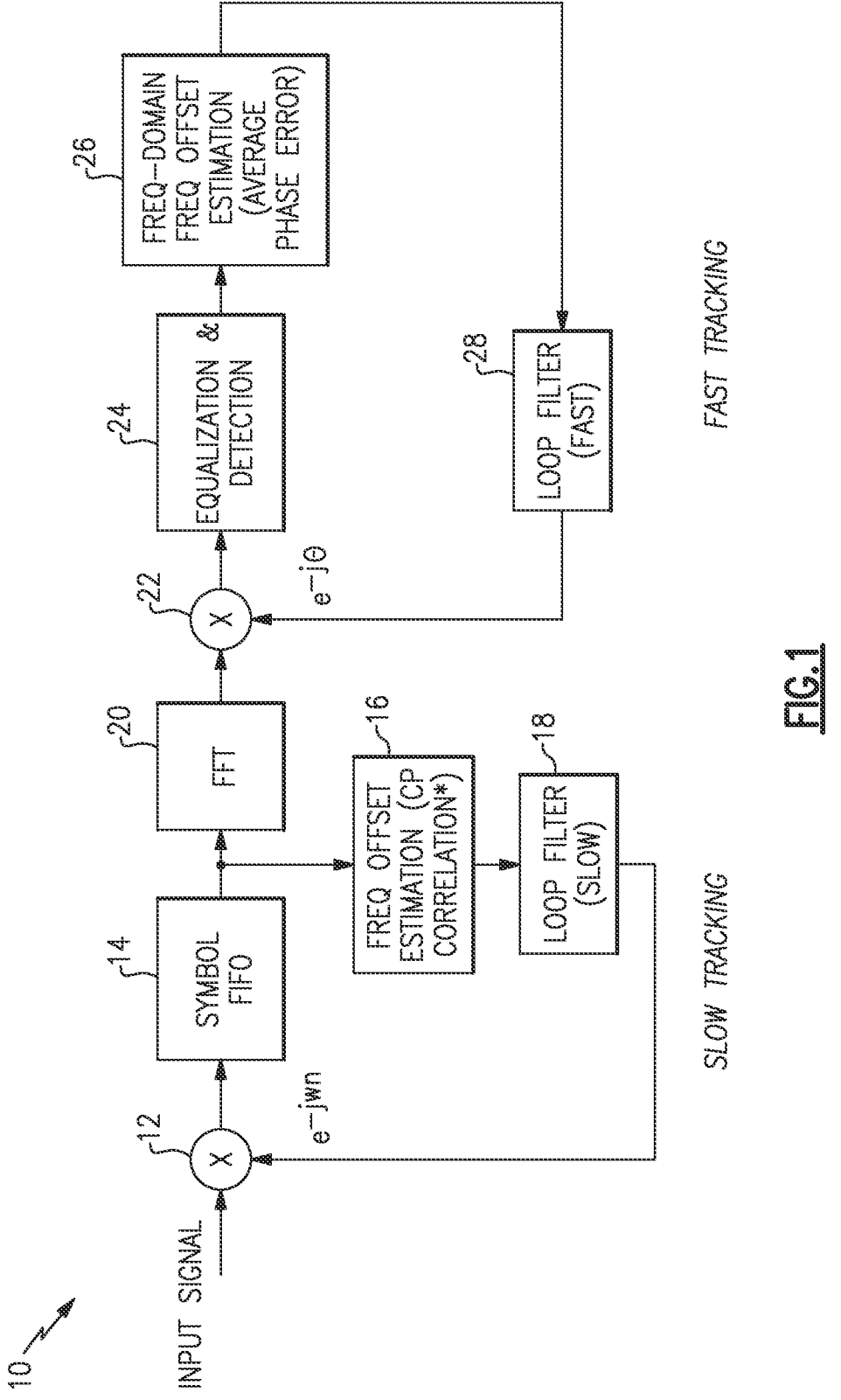
FIG. 1 is a schematic block diagram of a receive signal path with two offset compensation loops according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

This disclosure provides technical solutions to improve an orthogonal frequency-division multiplexing (OFDM) receiver performance in conditions where frequency offset is changing relatively quickly, such as on channels that have a relatively large Doppler shift. Offset compensation disclosed herein can estimate and correct the frequency offset of a received OFDM signal using two independent schemes. These two independent schemes can run concurrently.

The first scheme can be performed on a time domain OFDM signal. In some instances, the first scheme is performed completely in the time-domain. The frequency offset can be estimated using cyclic prefix (CP) correlation. The time domain OFDM signal can be compensated through a loop filter. This loop filter can be tuned to operate relatively slowly to achieve a relatively large averaging effect. An offset compensation value can be applied to reduce frequency offset. Offset compensation can be applied by adjusting a frequency of an oscillator that provides a signal to a mixer and/or in the digital domain by complex exponential multiplication. The first scheme can track an average value of carrier frequency offset due to the transmitter and receiver oscillators. The first scheme can apply offset correction within about 100 symbols or a few 100 symbols. The first scheme can be referred to as slow frequency correction.

The time domain OFDM signal can be converted to a frequency domain signal. The second scheme can apply offset compensation on the frequency domain signal. The processing for the second scheme can be performed completely in the frequency domain. A frequency offset estimate can be obtained by comparing a received value of each subcarrier to an equalized and estimated constellation point. Going through a loop filter with little averaging effect, one phase correction value can be obtained per OFDM symbol. The next OFDM symbol can be phase-rotated with the phase correction value from the preceding OFDM symbol. The second scheme can track frequency offset due to phase noise, Doppler effects, fading offset, and/or other fast changing channel-related effects. The second scheme can apply offset correction within a few symbols. The second scheme can apply offset correction within one order of magnitude or two orders of magnitude fewer symbols than the first scheme. The second scheme can be referred to as fast frequency correction.

In an OFDM receiver, frequency offset can cause interference between subcarriers and reduce reception quality. A received baseband signal can contain frequency offset that can be categorized in to slow changing and fast changing. An example of slow changing frequency offset is the difference in the carrier frequency of the transmitter versus the carrier frequency of the receiver plus slow drift caused by temperature. Fading conditions can cause a fast-changing frequency offset (e.g., Doppler shift) with a magnitude proportional to a speed of a moving vehicle and carrier frequency of a radio signal. While in some cases this offset is relatively small and can be ignored (e.g., for low-speed vehicles), in other cases this offset can be significant and can cause degraded performance (e.g., high-speed vehicle such as Digital Audio Broadcasting (DAB) Rural 6). Another example of fast changing frequency offset is phase noise. Typically, slow frequency offset component is significantly larger than fast frequency offset component.

Frequency offset can be corrected in the time domain, before Fourier transformation to the frequency domain, in order to avoid inter-carrier interference (ICI). Any residual frequency offset can cause ICI, which is a form of noise, as well as a phase offset per frequency-domain subcarrier. Both ICI noise and phase offset can degrade performance if not corrected.

Frequency offset in the time domain can be modeled as:

$$x_n = z_n * e^{jwn} \qquad \text{(Equation 1)}$$

In Equation 1, $z_n$ represents time domain signal without frequency offset, $x_n$ represents the time domain signal with frequency offset, $w = 2\pi * f$ where f is a frequency offset, and n represents the $n^{th}$ sample.

Frequency offset in the frequency domain can be modeled as:

$$X_n = Z_n * e^{j\Theta} + \text{ICI\_noise} \qquad \text{(Equation 2)}$$

In Equation 2, $Z_n$ represents the frequency domain signal without frequency offset, $X_n$ represents the frequency domain signal with frequency offset, $\Theta$ represents the phase error proportional to frequency offset, and n represents $n^{th}$ frequency domain carrier.

The relation of $\Theta$ and frequency offset can be represented by Equation 3:

$$\Theta = T_{ofdm} * F_s * 2 * \pi * f \qquad \text{(Equation 3)}$$

In Equation 3, $T_{ofdm}$ represents the time duration of an OFDM symbol, $F_s$ represents the sample rate of the input signal, and f represents the frequency offset.

In some OFDM receivers, a frequency offset loop can estimate the frequency offset in the time domain. This can involve using CP correlation. However, this estimate can be noisy. Accordingly, the loop can work slowly with relatively long averaging to correct the frequency offset and minimize ICI. Any fast changes in the frequency value may not be corrected and can cause degradation of the demodulated signal.

In some other OFDM receivers, a frequency offset loop can estimate a frequency offset in the frequency domain. This can involve frequency domain estimation using average phase error followed by a loop filter. In the presence of a small frequency offset, frequency offset estimation methods in the frequency domain can be more accurate than the frequency offset estimation in the time domain.

There can be a significant delay between input samples and estimated frequency correction values. In various receiver implementations, including DAB, Digital Radio Mondiale (DRM) 30, and/or Convergent Digital Radio (CDR), the delay between frequency estimation and frequency correction can be relatively large. Such delay can be undesirable because by the time the estimated frequency offset correction is applied, the actual frequency offset may be significantly different.

In cases where frequency offset correction and estimation is performed only on the OFDM signal in the frequency domain, a loop filter can have a relatively long time constant to remove mostly slow frequency offset. Such a loop filter can ignore the fast-changing frequency offset. Also, in this case, frequency offset estimations can be decision directed, so it can work best when the frequency offset is relatively small (e.g., low ICI noise at the input to estimator) and it may not adequately estimate the frequency offset for large initial frequency offsets (e.g., due to high ICI noise at the input to estimator). Accordingly, it may be advisable to remove the bulk of the frequency offset in the time domain before transforming received signal to the frequency domain.

There is a technical problem with certain standard frequency offset loops measuring in the frequency domain that involve a slow loop filter that may not remove fast changes in frequency offset and can limit overall performance in certain channel conditions.

Aspects of this disclosure relate to a technical solution that includes frequency offset estimation and correction in the time domain to reduce and/or minimize an ICI component and to correct relatively large frequency offsets. At the same time, frequency offset estimation and correction in the frequency domain can be performed to reduce and/or minimize correction delay. Such a method of correcting both fast and slow components of frequency offset can increase performance results over previous offset correction solutions.

Embodiments of this disclosure can improve frequency offset correction and thus reception quality by implementing two independent estimation, tracking, and correction processes.

FIG. 1 is a schematic block diagram of a receive signal path with two offset compensation loops according to an embodiment. A first offset compensation loop can compensate for a slow-moving frequency offset, such as a carrier frequency offset, in a time domain OFDM signal. A second offset compensation loop can compensate for a phase error caused by a fast-moving frequency offset, in a frequency domain OFDM signal that is generated from the time domain OFDM signal. As illustrated in FIG. 1, a receiver 10 includes a first phase rotator 12, a buffer 14, the first offset compensation loop including a first offset estimation circuit 16 and a first loop filter 18, a Fourier transform engine 20, the second phase rotator 22, an equalization and detection circuit 24, and the second offset compensation loop including a second offset estimation circuit 26 and a second loop filter 28.

A time domain OFDM input signal is received by the first phase rotator 12. The first phase rotator 12 can rotate a phase of the time domain OFDM input signal based on a first offset compensation value generated by the first offset compensation loop. The buffer 14 can store OFDM signal samples. The buffer 14 can be a first in first out (FIFO) buffer. The buffer 14 can store one or a plurality of OFDM symbols. For example, the buffer 14 can store 2, 3, or 4 OFDM symbols in certain applications. Accordingly, the buffer 14 can introduce a corresponding delay in providing time domain OFDM symbols to the first offset compensation loop.

Samples stored in buffer 14 can be output to the first offset compensation loop. There can be significant delay through the buffer 14, which can be implemented in a variety of OFDM modems including DRM, DAB, and CDR implementations. Such a delay can help with timing delay correction. Even without a buffer 14, there can be one or more sources of delay that can present technical challenges to offset estimation in the frequency domain and correction in time-domain. Sources of this delay include, but are not limited to, one or more of real-time specifications, pipelined fast Fourier transform (FFT) implementations, or architectures where a voltage-controlled oscillator (VCO) frequency is adjusted in hardware.

In the first offset compensation loop, the first offset estimation circuit 16 can estimate a frequency offset in time domain OFDM symbols provided by the buffer 14. The first offset estimation circuit 16 can use a cyclic prefix (CP) to estimate the frequency offset in the time domain. For example, CP correlation can be performed by the first frequency offset estimation circuit 16. The estimate of frequency offset can be provided to the first loop filter 18. The first loop filter 18 can have filter coefficients to set a relatively long time constant. The first loop filter 18 operating relatively slowly can achieve a relatively large averaging effect. This can track the average value of carrier frequency offset due to differences between a transmitter oscillator and a receiver oscillator, for example. The first offset compensation loop can provide a first offset compensation value to the first phase rotator 12 to apply frequency offset compensation to the time domain OFDM input signal. This can compensate for relatively slow frequency offset changes in the time domain OFDM signal. The first offset compensation value can be delayed by the delay from the buffer 14 plus the delay from the first offset compensation loop. The first phase rotator 12 can digitally adjust phase by complex exponential multiplication.

For time domain compensation, frequency offset can be calculated and the compensation can be done by complex exponent multiplication with phase incremented by 2πf per each sample. The phase rotator 12 can perform phase rotation as represented by Equation 4:

$$y_n = x_n * e^{-jwn} \qquad \text{(Equation 4)}$$

In Equation 4, $y_n$ represents the output of the phase rotator 12, $x_n$ represents the input to the phase rotator 12, w=2π*f, with f being the estimated frequency offset estimated in the first frequency offset estimation circuit 16 after loop filtering with the first loop filter 18, and n is the $n^{th}$ sample.

The Fourier transform engine 20 can generate frequency domain OFDM symbols from incoming time domain OFDM symbols. The Fourier transform engine 20 can apply fast Fourier transforms (FFTs). In certain applications, each incoming time domain OFDM symbol can be processed by Fourier transform engine 20 into a plurality of sub-carriers. The number of sub-carriers corresponding to a given OFDM symbol can vary depending on bandwidth of signal and a time duration of the OFDM symbol (without a cyclic prefix).

The second phase rotator 22 can rotate a phase of the frequency domain OFDM symbols from the Fourier transform engine 20 based on a second offset compensation value generated by the second offset compensation loop. The equalizer and detection circuit 24 can perform equalization and symbol detection on frequency domain OFDM symbols. The output signal from the equalizer and detection circuit 24 can be provided to the second offset compensation loop.

The second offset compensation loop can provide fast moving offset compensation. The delay of the buffer 14 is not in the second offset compensation loop. When the Fourier transform engine 20 outputs frequency domain OFDM symbols, the bulk of the slowly changing frequency offset can already be removed. The remainder of the frequency offset can be estimated using OFDM subcarriers in the frequency domain. In the frequency-domain, the remaining frequency offset can be a phase value indicating the average phase rotation of all the subcarriers. The OFDM subcarriers can be de-rotated by this phase value using the second phase rotator 22.

For the frequency domain in OFDM, the effect of frequency offset can be (X(0)*, X(1)*, X(2)*, X(3)*, ... ). The second offset compensation loop can estimate Θ and correction. The phase rotator 22 can perform phase rotation for offset compensation as represented by Equation 5:

$$Y_n = X_n * e^{-j\Theta} \qquad \text{(Equation 5)}$$

In Equation 5, $Y_n$ represents the output of the phase rotator 22, $X_n$ represents the input to the phase rotator 22, Θ represents the average phase error per carrier proportional to frequency offset, and n represents the $n^{th}$ frequency domain carrier.

In the second offset compensation loop, the second offset estimation circuit 26 can estimate a phase error in the frequency domain OFDM symbols. The phase error estimate from the second offset estimation circuit 26 can be provided to the second loop filter 28. The second loop filter 28 can have filter coefficients to set a relatively fast time constant. The first loop filter 18 can have a longer time constant than the second loop filter 28. The second loop filter 28 operating relatively fast can achieve a relatively small averaging effect. The second loop filter 28 can track the frequency offset due to phase noise and Doppler effects of a fading channel, for example. The second offset compensation loop can provide a second offset compensation value to the second phase rotator 22 to apply frequency offset compensation to the frequency domain OFDM symbols provided by the Fourier transform engine 20. This can compensate for relatively fast frequency changes in the frequency domain OFDM symbols.

Figure 3:
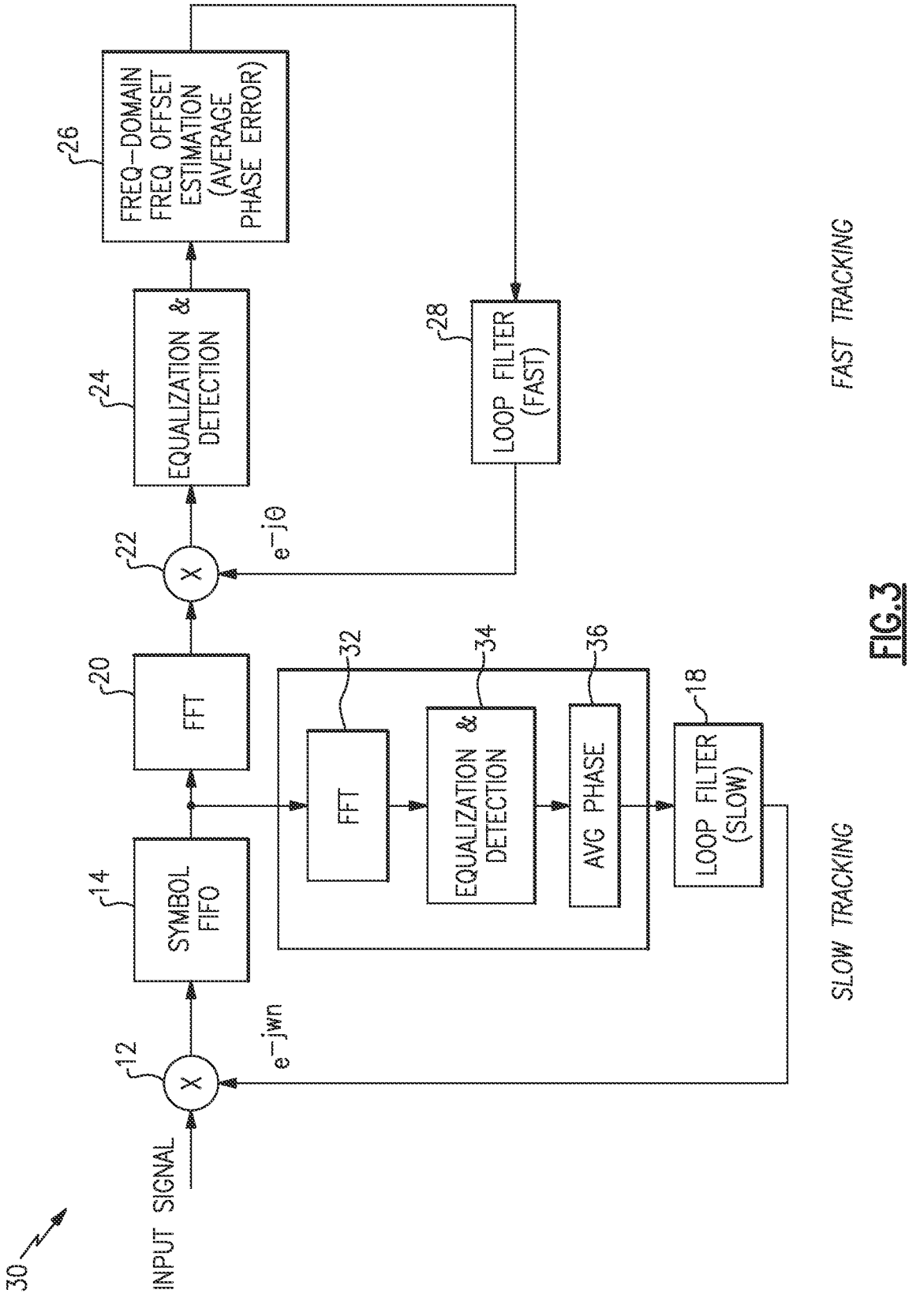
FIG. 3 is a schematic block diagram of a receive signal path with two offset compensation loops where both loops use frequency domain offset estimation techniques according to an embodiment.

The blocks of the receivers in FIGS. 1, 3, and/or 4 can be implemented by a digital signal processor (DSP). Alternatively or additionally, one or more of the blocks of the receivers in FIGS. 1, 3, and/or 4 can be implemented by other suitable digital circuitry.

An advantage of the frequency compensation in the receiver 10 is the ability to track out fast changes in the phase error. This can improve bit error rate (BER) performance in a variety channel conditions. For example, in DAB with a Rural 6 channel model, the improvement can be about 1 decibel (dB) at a threshold BER of $7\times10^{-4}$.

Figure 2:
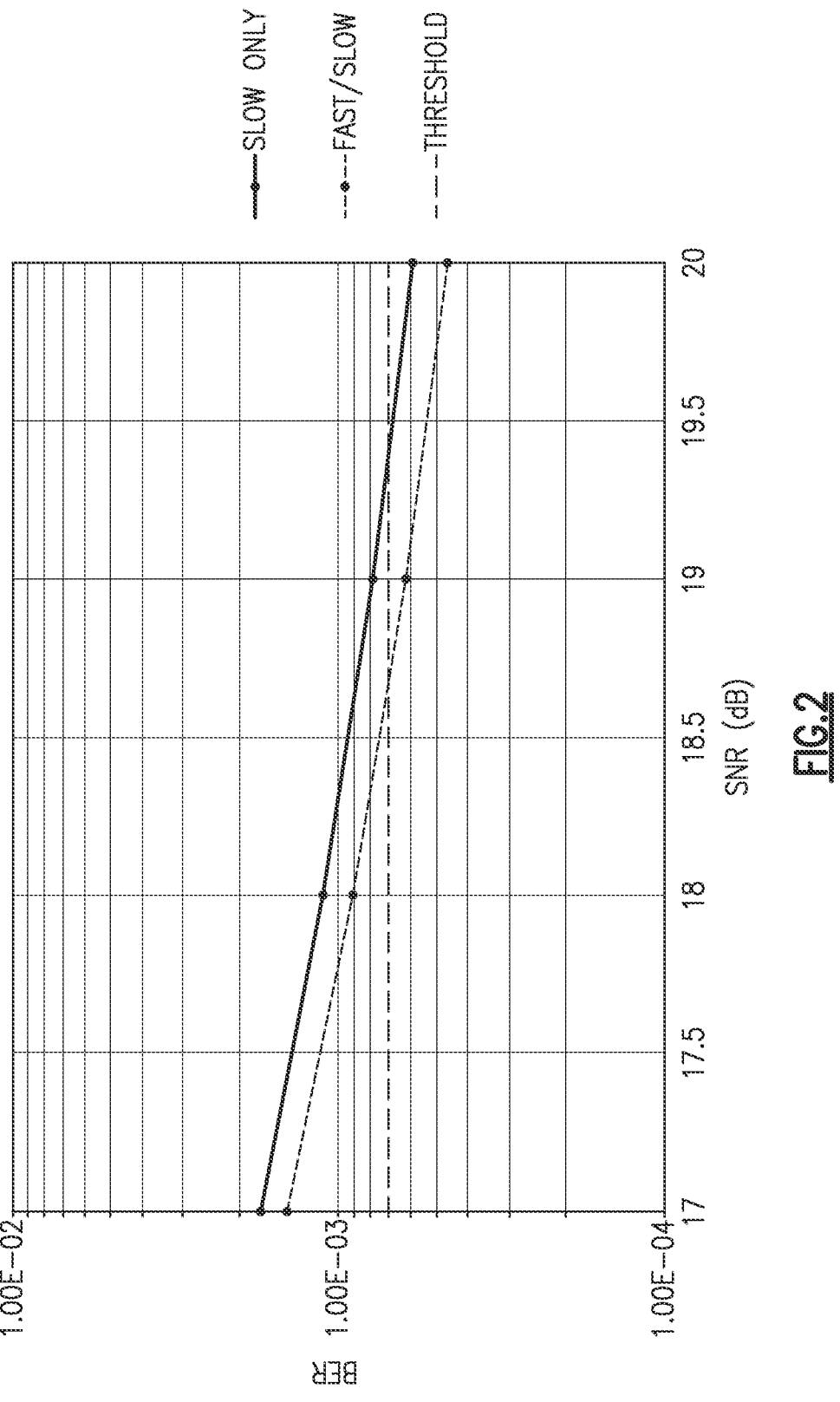
FIG. 2 is a graph of bit error rate performance comparing an embodiment to another solution with one compensation loop.

FIG. 2 is a graph of BER performance comparing an embodiment to another solution with one correction loop for slow frequency offset correction. These simulations are for DAB with a Rural 6 channel for EEP4A protection mode. FIG. 2 indicates that the embodiment with two independent correction loops has about 1 dB signal to noise ratio (SNR) improvement at threshold of $7\times10^{-4}$ BER relative to the other solution with one correction loop for slow frequency offset correction.

Although the first frequency estimation circuit 16 in the first offset compensation loop of FIG. 1 can estimate a frequency offset in the time domain, any suitable frequency domain technique can be used to alternatively or additionally estimate frequency offset in time domain OFDM symbols.

FIG. 3 is a schematic block diagram of a receive signal path with two offset correction loops where both loops use frequency domain offset estimation techniques according to an embodiment. A receiver 30 of FIG. 3 is like the receiver 10 of FIG. 1, except that the first offset compensation loop is implemented differently. In the receiver 30, the first offset compensation loop includes a Fourier transform engine 32, an equalization and detection circuit 34, a phase averaging circuit 36, and the first loop filter 18. The first offset compensation loop of the receiver 30 uses frequency domain offset estimation on time domain OFDM symbols. The frequency domain offset estimation in the first offset compensation loop can be similar to the frequency domain offset estimation in the second offset compensation loop, except that (1) the compensation from the first offset compensation loop is performed on time domain OFDM symbols and (2) the first offset compensation loop includes a loop filter with a slower time constant than the loop filter of the second offset compensation loop.

The Fourier transform engine 32 can generate frequency domain OFDM symbols from time domain OFDM symbols provided by the buffer 14. For example, the Fourier transform engine 32 can perform FFTs on the time domain OFDM symbols to generate frequency domain OFDM symbols. The equalization and detection circuit 34 can perform equation and symbol detection on these frequency domain OFDM symbols. The phase averaging circuit 36 can estimate a frequency offset in the time domain OFDM symbols. The first loop filter 18 can filter the output of the phase averaging circuit 36. The first offset compensation loop can provide a first offset compensation value to the first phase rotator 12 to apply frequency offset compensation to the time domain OFDM input signal. This can compensate for relatively slow frequency changes in the time domain OFDM symbol.

In certain embodiments, the second offset compensation loop can separately process different frequency ranges. This can generate separate offset compensation values for the different frequency ranges.

Figure 4:
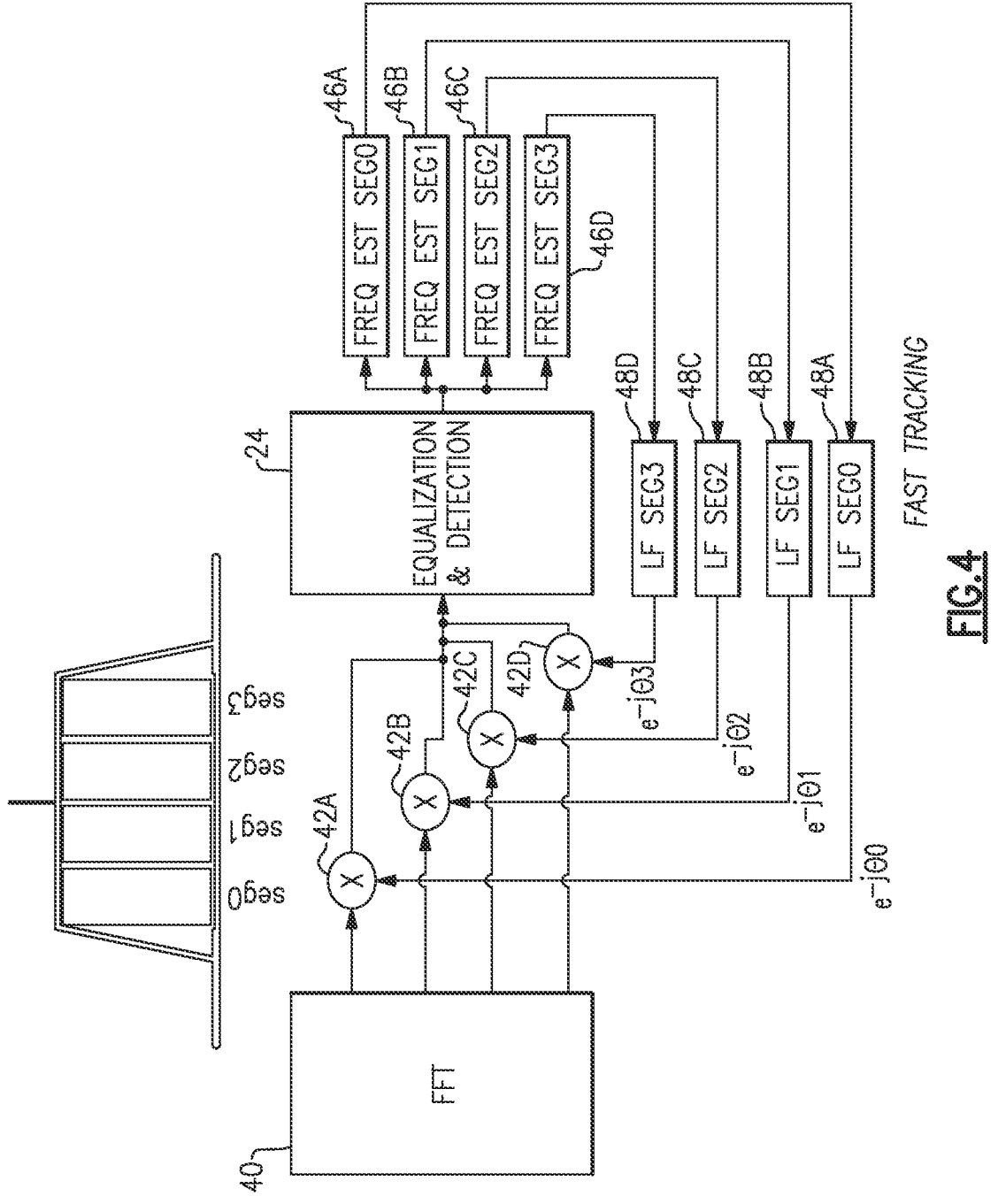
FIG. 4 is a schematic block diagram of receive blocks for frequency selective offset compensation to compensate for offsets in individual frequency segments according to an embodiment.

FIG. 4 is a schematic block diagram of receive blocks for frequency selective offset compensation to compensate for offsets in individual frequency segments according to an embodiment. In FIG. 4, the second offset compensation loop is divided into segments to operate on different frequency segments and an offset compensation value is generated for each frequency segment. A frequency range can be divided into any suitable number of frequency segments for separate processing. For example, in FIG. 4, the frequency range is divided in to four segments.

Referring to FIG. 4, a Fourier transform engine 40 can output frequency bins for each of the frequency segments. Phase rotators 42A, 42B, 42C, and 42D can apply offset compensation on the outputs for corresponding frequency segments provided by the Fourier transform engine 40. The second offset compensation loop can include offset estimation circuits 46A, 46B, 46C, and 46D to estimate a frequency offset for a respective frequency segment. The frequency offset estimates for the frequency segments can be provided to respective loop filters 48A, 48B, 48C, and 48D. These loop filters 48A, 48B, 48C, and 48D can have filter coefficients to set a relatively fast time constant. The second offset compensation loop can provide second offset compensation values to the phase rotators 42A, 42B, 42C, and 42D to apply frequency offset compensation for individual frequency segments. In this offset compensation, individual offset compensation values for respective frequency segments can be applied to phase rotators 42A, 42B, 42C, and 42D.

Accordingly, for each frequency segment, a frequency offset estimate is generated, loop filtered, and the corresponding frequency bins output from the Fourier transform engine 40 are modified with the phase rotations 42A, 42B, 42C, and 42D in the offset compensation loop of FIG. 4. In the offset compensation loop of FIG. 4, a frequency selective method is applied where each frequency segment is individually corrected. This method can be advantageous when a frequency offset is selective across frequency, for example, in DAB channels Rural 6 or a single frequency network (SFN).

The offset compensation of FIG. 4 can be applied to receivers with a plurality of independent offset compensation loops. The offset compensation loop of FIG. 4 can be implemented together with a slow offset compensation loop in accordance with any suitable principles and advantages disclosed herein. Any suitable principles and advantages of the offset compensation of the embodiment of FIG. 4 can be implemented in association with any suitable principles and advantages of the receiver 10 of FIG. 1 and/or the receiver 30 of FIG. 3.

FIG. 5 is a flow diagram of a method 50 of offset compensation according to an embodiment. The method 50 can involve applying two independent offset compensation loops on an orthogonal frequency-division multiplexing signal in a radio receiver. One offset compensation loop can apply offset compensation on a time domain orthogonal frequency-division multiplexing signal and the other offset compensation loop can apply offset compensation on ta frequency domain orthogonal frequency-division multiplexing signal. The method 50 can be performed using any suitable blocks and/or circuits, such as any suitable blocks and/or circuits of the embodiments of FIGS. 1, 3, and/or 4.

At block 52, a carrier frequency offset in a time domain orthogonal frequency-division multiplexing signal can be compensated for based on an estimate of the moving average of the carrier frequency offset. The carrier frequency offset compensation can apply relatively slow frequency correction. For example, a loop filter in such an offset compensation loop can be tuned to have a relatively large averaging effect.

The estimate of the carrier frequency offset can be generated in the time domain. This estimation can be based on cyclic prefix correlation. Example time domain offset estimation is discussed with reference to FIG. 1. In some instances, estimate of the carrier frequency offset can be generated with frequency domain offset estimation. Example frequency domain offset estimation is discussed with reference to FIG. 3. The carrier frequency offset compensation can be applied before buffering the time domain orthogonal frequency-division multiplexing signal.

A frequency domain signal can be generated from the time domain orthogonal frequency-division multiplexing signal at block 54. This can involve applying a Fourier transform, such as an FFT.

At block 56, a fast changing part of frequency offset in the frequency domain signal can be compensated for based on an estimate of average phase error. The carrier frequency offset compensation can apply relatively fast frequency correction. This can compensate for different types of frequency offsets, such as phase noise and Doppler offsets. A loop filter in a compensation loop for compensating for Doppler offsets and phase noise can have a shorter time constant than a loop filter in a compensation loop that compensates for a relatively slow frequency correction.

The estimate of the phase error per FFT output (or OFDM symbol) can be generated using average of phase error estimations per each FFT bin. The phase error per OFDM symbol compensation can be applied before equalizing the frequency domain signal. The phase error compensation can be applied on a plurality of individual frequency segments of a frequency domain orthogonal frequency-division multiplexing signal in certain applications.

FIG. 6 is a schematic diagram of an example radio system 100 according to an embodiment. The radio system 100 can receive and process a digital radio signal. The radio system 100 can generate audio from the digital radio signal. The radio system 100 can process a digital radio signal that is in accordance one or more suitable digital radio standards, such as one or more of National Radio System Committee (NRSC-5C, also known as HD™ radio), DAB, DRM, CDR, or another digital radio standard. As illustrated, the radio system 100 includes an antenna 102, a low noise amplifier (LNA) 104, an analog-to-digital converter (ADC) 108, digital signal processing circuitry 110, a digital-to-analog converter (DAC) 112, an amplifier 114, and a speaker 116.

The radio system 100 is an example system that can process a received digital radio signal in accordance with any suitable principles and advantages disclosed herein. The digital signal processing circuitry 110 can perform frequency offset correction of with two independent offset correction loops in accordance with any suitable principles and advantages disclosed herein. The radio system 100 can be configured for receiving and processing the OFDM radio signals.

With reference to the radio system 100 of FIG. 6, a radio frequency signal that includes digital radio signals according to a given digital broadcast specification can be received via the antenna 102. In some instances, the radio frequency signal can be received via two or more antennas.

A radio frequency signal received via the antenna 102 can be processed by a receive signal path and provided to the digital signal processing circuitry 110. The radio frequency signal path includes at least an LNA 104, a mixer 106, and an ADC 108. In some instances, the radio frequency signal path can include additional circuit elements, such as one or more filters, one or more amplifiers with automatic gain control, etc. A radio frequency signal received via the antenna 102 can be amplified by the LNA 104. The amplified RF signal can be downconverted by the mixer 106. The downconverted signal generated by the mixer 106 can be a low-intermediate frequency (IF) signal or a zero-IF signal, for example. The downconverted signal can include an in-phase/quadrature phase (IQ) signal. The ADC 108 can digitize the downconverted signal into a digital signal.

The digital signal processing circuitry 110 can perform any suitable processing on the digitized signal provided by the ADC 108. For example, the digital signal processing circuitry 110 can perform processing described with reference to one or more of FIG. 1, 3, 4, or 5. The digital signal processing circuitry 110 can compensate for frequency offsets in accordance with any suitable principles and advantages disclosed herein. The digital signal processing circuitry 110 can generate an audio output signal.

The audio output signal can be converted from a digital signal to an analog signal by a digital-to-analog converted (DAC) 112. The analog audio signal can be amplified by amplifier 114. The amplified analog audio signal can be provided to a speaker 116. The speaker 116 can output audio. While one speaker is shown in FIG. 6, audio can be output from any suitable number of speakers based on one or more audio signals provided by the digital signal processing circuitry 110.

Figure 7:
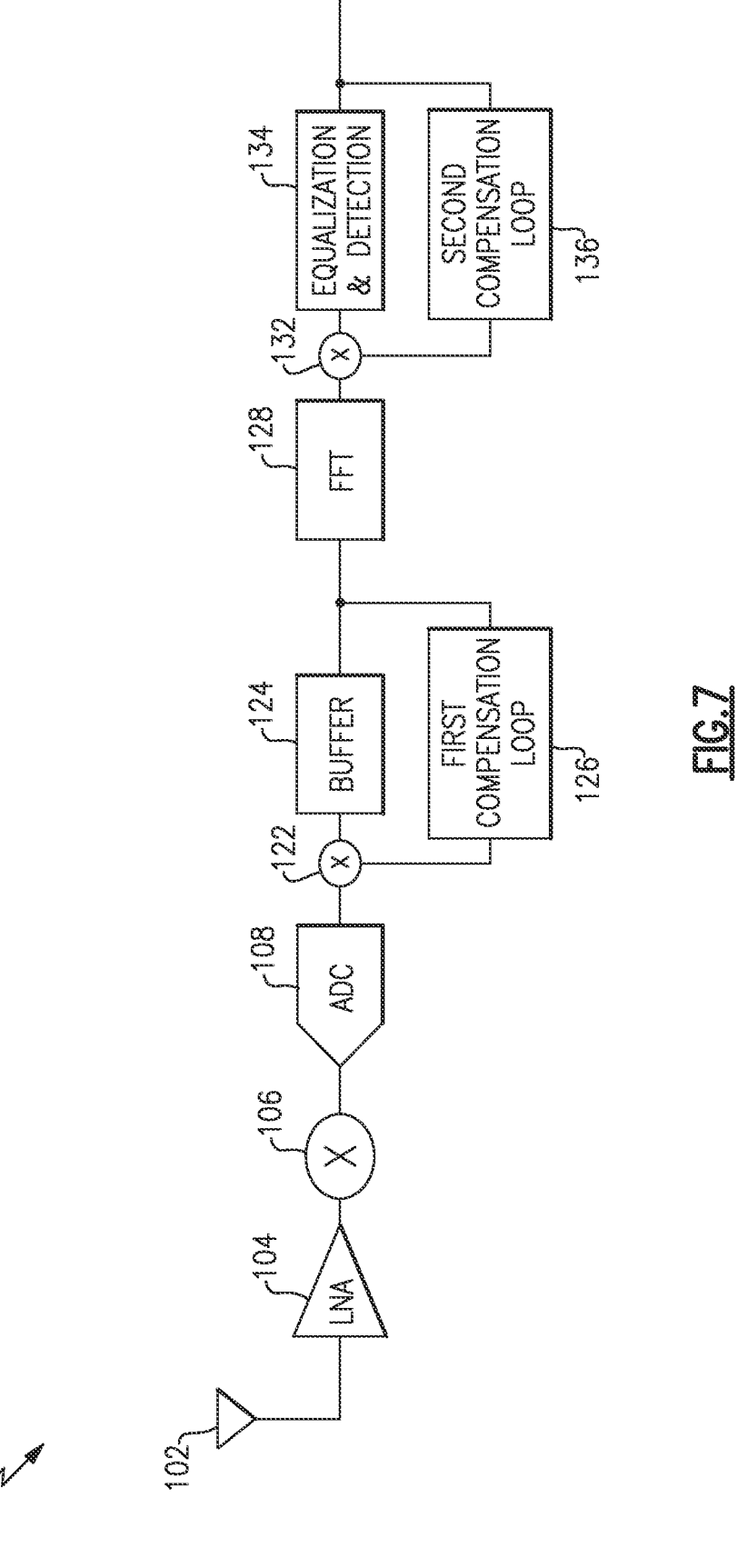
FIG. 7 is a schematic diagram of a receiver according to an embodiment.

FIG. 7 is a schematic diagram of a receiver 120 according to an embodiment. The receiver 120 includes two compensation loops in accordance with any suitable principles and advantages disclosed herein. In some embodiments, receiver 120 can be embodied in a single die integrated circuit, such as a complementary metal oxide semiconductor (CMOS) die having mixed signal circuitry including both analog and digital circuitry. According to some other embodiments, the receiver 120 can be implemented by two or more semiconductor dies.

As illustrated, the receiver 120 includes an antenna 102, an LNA 104, a mixer 106, an ADC 108, a first phase rotator 122, a buffer 124, a first compensation loop 126, a Fourier transform engine 128, a second phase rotator 132, an equalization and detection circuit 134, and a second compensation loop 136. The first phase rotator 122, the buffer 124, the first compensation loop 126, the Fourier transform engine 128, the second phase rotator 132, the equalization and detection circuit 134, and a second compensation loop 136 can be included in the digital signal processing circuitry 110 of FIG. 6.

A radio frequency signal is received at the antenna 102. The LNA 104 amplifies the radio frequency signal. The LNA 104 can be considered a radio frequency front end block. In certain applications, the receiver 120 can include additional radio frequency circuitry (not illustrated in FIG.

7), such as one or more filters. The mixer 106 can downconvert the amplified radio frequency signal provided by the LNA 104 to a lower frequency signal. In certain applications, this lower frequency signal can a low-IF or zero-IF signal. The downconverted signal can be an IQ signal.

The ADC 108 can digitize the downconverted signal into a digital signal at a sampling rate that can be based on a sampling clock signal. In certain applications, either before or after digitization, channelization may be performed to generate a channelized signal. In an OFDM system, a plurality of samples can form an OFDM symbol of an incoming data stream.

The buffer 124 can receive samples from the ADC 108. In some applications, there can be intervening processing between the ADC 108 and the buffer 124. The buffer 124 can be a first in first out (FIFO) symbol buffer.

The buffer 124 can provide OFDM symbols to the first compensation loop 126. The first compensation loop 126 can generate a first offset compensation value in accordance with any suitable principles and advantages disclosed herein. The first phase rotator 122 can apply phase rotation based on the first offset compensation value. This can provide offset compensation for a relatively slow-moving frequency offset, such as a carrier frequency offset, on a time domain OFDM signal. In some other applications (not illustrated in FIG. 7), the first compensation loop 126 can provide a first offset compensation value to an oscillator to adjust a frequency of a signal provided to the mixer 106. This can provide frequency offset correction in an output signal provided by the mixer 106.

Samples stored in the buffer 124 can be output to the Fourier transform engine 128. The Fourier transform engine 128 can generate frequency domain OFDM symbols from incoming time domain OFDM symbols. In certain applications, each incoming time domain OFDM symbol can be processed by Fourier transform engine 128 into a plurality of sub-carriers. The number of sub-carriers corresponding to a given OFDM symbol can vary depending on bandwidth of signal and a time duration of the OFDM symbol (without a cyclic prefix).

The sub-carrier outputs from Fourier transform engine 128 can form a frequency domain symbol that is provided to the equalization and detection circuit 134. The output signal from the equalization and detection circuit 134 can be provided to the second compensation loop 136. The second compensation loop 136 can generate one or more second offset compensation values in accordance with any suitable principles and advantages disclosed herein. The second phase rotator 132 can apply phase rotation based on the one or more second offset compensation values. This can provide offset compensation for a relatively fast-moving frequency offset, by correcting phase error caused by this frequency offset, on a frequency domain OFDM signal.

Although shown as individual components, portions of the receiver 120 after ADC 108 to the end of the signal processing path of FIG. 7 can be implemented in a digital signal processor (DSP). Other implementations are possible, and additional circuitry can be present. For example, in certain applications, additional circuitry can be implemented. In addition, compensation loops and/or circuitry to apply offset compensation may be configured in other types of hardware, may be realized via combinations of hardware, firmware, and/or software, and also may be implemented within a microcontroller or DSP.

Figure 8:
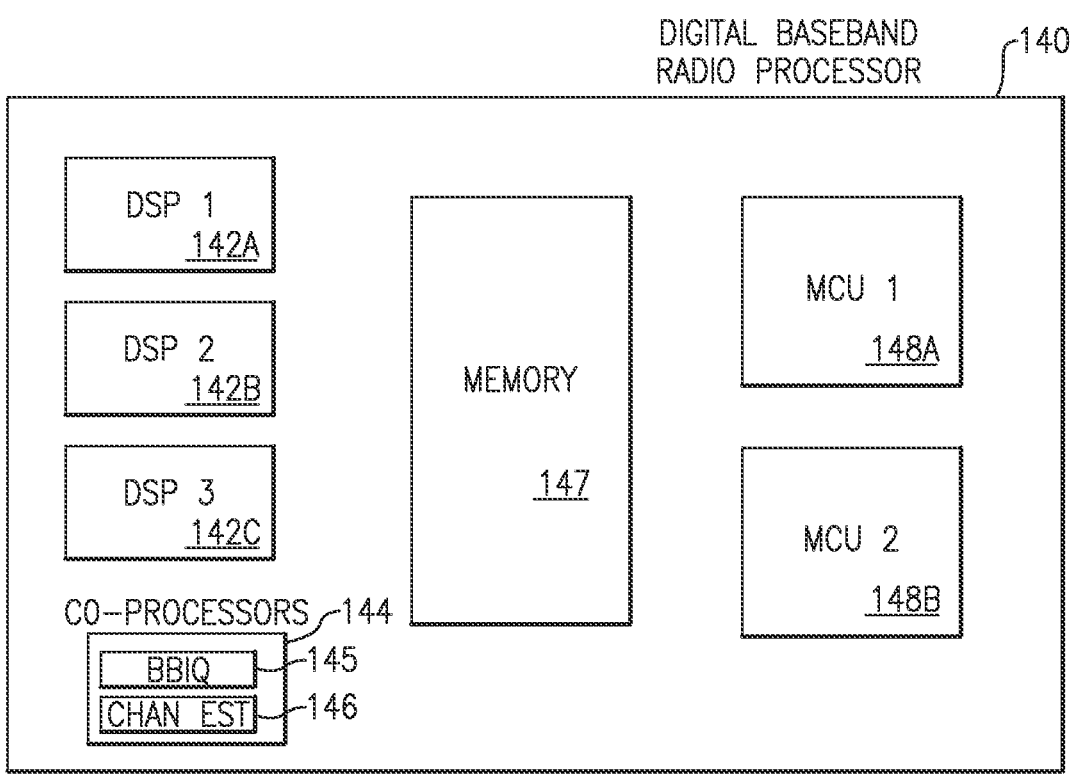
FIG. 8 is a schematic block diagram of a digital radio baseband processor according to an embodiment.

FIG. 8 is a schematic block diagram of a digital radio baseband processor 140 according to an embodiment. As illustrated, the digital radio baseband processor 140 includes a plurality of DSPs 142A, 142B, 142C, a plurality of co-processors 144 including a baseband IQ (BBIQ) co-processor 145 and a channel estimation co-processor 146, a memory 147, and microcontrollers (MCUs) 148A and 148B.

In certain applications, the offset compensation disclosed herein can be implemented in a single DSP 142A with help from the BBIQ co-processor 145 and the channel estimation co-processor 146 in the digital radio baseband processor 140. In some other applications, the offset compensation disclosed herein can be implemented in an application specific integrated circuit (ASIC) or a hardware accelerator.

Offset compensation disclosed can be implemented in DAB radio system firmware. Offset compensation disclosed herein can be applied to other digital radio standards, including, but not limited to, NRSC-5C, DRM, and CDR. Offset compensation disclosed herein is applicable to other suitable OFDM standards including, but not limited to, WiFi and/or other IEEE 802.11 standards, Long Term Evolution (LTE), Digital Video Broadcasting-Terrestrial (DVB-T), etc.

Any of the embodiments described above can be implemented in radio systems. The principles and advantages of the embodiments can be used for any systems or apparatus, such as any radio receiver, that could benefit from any of the embodiments described herein. The teachings herein are applicable to a variety of systems. In certain applications, radio systems disclosed herein are implemented in vehicles such as automobiles. Although this disclosure includes some example embodiments, the teachings described herein can be applied to a variety of structures.

Aspects of this disclosure can be implemented in various electronic devices. Examples of the electronic devices can include, but are not limited to, consumer electronic products, parts of the consumer electronic products, radio receivers, wireless communication infrastructure, electronic test equipment, etc. Examples of the electronic devices can include, but are not limited to, a stereo system, a digital music player, a radio, a vehicular electronics system such as an automotive electronics system, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively.

While certain embodiments have been described, these embodiments have been presented by way of example only, and are not intended to limit the scope of the disclosure.

Indeed, the methods, systems, and circuits described herein may be embodied in a variety of other forms. Furthermore, various omissions, substitutions, and changes in the form of the methods, systems, and circuits described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A method of frequency offset compensation in a radio receiver, the method comprising:

generating, in the radio receiver, an estimate of a carrier frequency offset in a time domain orthogonal frequency-division multiplexing signal based on processing the time domain orthogonal frequency-division multiplexing signal;

compensating, using a first compensation loop in the radio receiver, for the carrier frequency offset in the time domain orthogonal frequency-division multiplexing signal based on the estimate of the carrier frequency offset, the first compensation loop including a first loop filter;

generating a frequency domain orthogonal frequency-division multiplexing signal in the radio receiver from the time domain orthogonal frequency-division multiplexing signal; and compensating, using a second compensation loop in the radio receiver, for a phase error offset in individual frequency segments of the frequency domain orthogonal frequency-division multiplexing signal based on estimates of the phase error offset for the individual frequency segments, the second compensation loop including a plurality of loop filters each having a longer time constant than the first loop filter.

2. The method of claim 1 further comprising generating the estimates of the phase error offset for the individual frequency segments with a plurality of phase error offset estimation circuits, each of the plurality of phase error offset estimation circuits being associated with a respective frequency segment of the individual frequency segments.

3. The method of claim 2 further comprising filtering the estimates of the phase error offset with respective loop filters of the plurality of loop filters, the compensating being based on outputs of the plurality of loop filters.

4. The method of claim 1 wherein the compensating for the phase error offset is applied before equalizing the frequency domain orthogonal frequency-division multiplexing signal.

5. The method of claim 1 further comprising generating the estimates of the phase error offset using average phase error estimation.

6. The method of claim 1 wherein the processing the time domain orthogonal frequency-division multiplexing signal includes cyclic prefix correlation.

7. The method of claim 1 further comprising storing time domain orthogonal frequency-division multiplexing symbols in a buffer, the buffer having an output coupled to an input of a Fourier transform engine that generates the frequency domain orthogonal frequency-division multiplexing signal.

8. The method of claim 1 wherein the frequency domain orthogonal frequency-division multiplexing signal is a Digital Audio Broadcasting signal.

9. A radio receiver with frequency offset compensation, the radio receiver comprising:

a first compensation loop configured to receive a time domain orthogonal frequency-division multiplexing signal and to compensate for a carrier frequency offset in the time domain orthogonal frequency-division multiplexing signal, the first compensation loop including a carrier frequency offset estimation circuit and a first loop filter;

a Fourier transform engine configured to convert the time domain orthogonal frequency-division multiplexing signal into frequency domain orthogonal frequency-division multiplexing signal; and a second compensation loop configured to apply phase error offset compensation to individual frequency segments of the frequency domain orthogonal frequency-division multiplexing signal, the second compensation loop including a plurality of phase error offset estimation circuits and a plurality of loop filters, the plurality of loop filters each having a longer time constant than the first loop filter.

10. The radio receiver of claim 9 further comprising a plurality of phase rotators and an equalizer, the plurality of phase rotators being in signal paths from the Fourier transform engine to the equalizer, and the plurality of phase rotators being connected to outputs of the plurality of loop filters.

11. The radio receiver of claim 10 wherein the plurality of phase error offset estimation circuits are in signal paths between the equalizer and the plurality of loop filters.

12. The radio receiver of claim 9 wherein the frequency domain orthogonal frequency-division multiplexing signal is a Digital Audio Broadcasting signal.

13. The radio receiver of claim 9 further comprising a buffer configured to store time domain orthogonal frequency-division multiplexing symbols, the buffer having an output coupled to an input of the Fourier transform engine.

14. The radio receiver of claim 9 wherein the plurality of phase error offset estimation circuits includes at least 4 phase error offset estimation circuits.

15. The radio receiver of claim 9 wherein phase error offset in the frequency domain orthogonal frequency-division multiplexing signal is frequency selective.

16. The radio receiver of claim 9 wherein the carrier frequency offset estimation circuit is configured to generate an estimate of the carrier frequency offset based on cyclic prefix correlation.

17. A radio system with frequency offset compensation and phase error compensation, the radio system comprising:

at least one antenna configured to receive a radio signal, the radio signal being an orthogonal frequency-division multiplexing signal; and a radio receiver including a first compensation loop and a second compensation loop, the first compensation loop including a first loop filter, the first compensation loop configured receive a time domain samples of the radio signal and to compensate for a carrier frequency offset using time domain circuitry, the second compensation loop including a plurality of loop filters each having a longer time constant than the first loop filter, and the second compensation loop configured to apply phase offset compensation for individual frequency segments of the radio signal in frequency domain circuitry.

18. The radio system of claim 17 further comprising a speaker in communication with the radio receiver.

19. The radio system of claim 17 wherein the first compensation loop includes a carrier frequency offset estimation circuit configured to generate an estimate of the carrier frequency offset based on cyclic prefix correlation.

* * * * *